Patented July 17, 1928.

1,677,123

UNITED STATES PATENT OFFICE.

ROGER ADAMS, OF URBANA, ILLINOIS, ASSIGNOR TO ABBOTT LABORATORIES, OF NORTH CHICAGO, ILLINOIS, A CORPORATION OF ILLINOIS.

CYCLOPENTENYL ALKYL ACETIC ACID.

No Drawing. Application filed August 25, 1927. Serial No. 215,517.

The invention relates to the preparation of $\Delta^2$-cyclopentenyl alkyl acetic acids, which are of value in the treatment of certain diseases, particularly those caused by B. leprae or B. tuberculoci. The compounds have the general formula

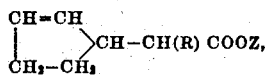

in which R represents an alkyl group containing five or more carbon atoms, and Z represents hydrogen or a substituted hydrogen, such as a metallic element or an alkyl group.

It has been found that the higher homologs in this series of compounds are more efficient bactericidally than those lower in the series.

General method of preparation.

The acids here referred to may conveniently be prepared by first condensing cyclopentenyl chloride with sodiomalonic ester, and isolating the cyclopentenyl malonic ester so obtained; this product is then condensed with an alkyl halide, in the presence of sodium ethylate, to give cyclopentenyl-alkyl-malonic ester. Upon saponification to the corresponding malonic acid, and heating to eliminate one of the carboxyl groups, the $\Delta^2$-cyclopentenyl alkyl acetic acids are obtained, and are purified by distillation under reduced pressure.

For example, beginning with cyclopentenyl chloride, the following procedure may be followed in the preparation of the cyclopentenyl alkyl acetic acids.

Example I.

Alpha-($\Delta^2$-cyclopentenyl)-undecanoic acid.

The molecular equivalent of cyclopentenyl chloride is added to 1.25 molecular equivalents of sodiomalonic ester in absolute alcohol. After the reaction is complete, the alcohol is distilled off, water is added to the residue, and the cyclopentenyl malonic ester is taken up in ether and dried. Upon distillation, it boils at 113–118° C. at 5 mm.

To 175 cc. of absolute alcohol, in a flask fitted with a stirrer and condenser, is added 5.8 grams sodium. After the latter has dissolved, 56.5 grams (0.25 mole) of $\Delta^2$-cyclopentenyl malonic ester is added. The condenser is fitted for distillation and 135 cc. of alcohol is distilled off. After changing the condenser to the upright position, 0.3 gram molecular weight of n-nonyl bromide is added and the mixture refluxed for 48 hours. The alcohol is distilled off and the water added to dissolve the sodium bromide. The layers are separated and the ester taken up in ether, dried, and distilled under diminished pressure, which yields pure $\Delta^2$-cyclopentenyl nonyl malonic ester.

A solution of 17 grams of potassium hydroxide and 0.1 gram molecular equivalent of n-nonyl-$\Delta^2$-cyclopentenyl malonic ester in 75 cc. of alcohol is refluxed for 24 hours. The solution is diluted with 60 cc. water and distilled until the temperature reaches 98° C. The residue is refluxed for two hours, cooled to 10°, and acidified with concentrated hydrochloric acid. The n-nonyl-$\Delta^2$-cyclopentenyl malonic acid is separated and the aqueous residue extracted with ether. The ether extract is dried, the ether evaporated, and the entire amount of the malonic acid derivative is heated for two hours at 160–165° C., in a flask fitted with an air cooled reflux condenser. The alpha-($\Delta^2$-cyclopentenyl)-undecanoic acid is distilled under diminished pressure; it boils at 173–176° C. at 3 mm.

Other homologs of this series of compounds may be prepared in an entirely similar manner, by substituting the appropriate alkyl group into the cyclopentenyl malonic ester as described above, and then proceeding as outlined. The intermediates and final acids so produced are described in the following table:—

Alpha-($\Delta^2$-cyclopentenyl)-substituted aliphatic acids.

General formula

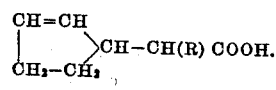

| R is. | Boiling point of the malonic ester. | Boiling point of the acid. |
|---|---|---|
| n-amyl | 133–136° (3 mm.) | 142–145° (5 mm.). |
| n-hexyl | 150–155° (4 mm.) | 150–155° (5 mm.). |
| n-heptyl | 159–164° (3 mm.) | 162–165° (4 mm.). |
| n-octyl | 169–174° (4 mm.) | 170–173° (4 mm.). |
| n-nonyl | 183–187° (5 mm.) | 173–176° (3 mm.). |

It is possible to reverse the method of preparation of the above substituted malonic esters by first introducing the alkyl group, followed by the cyclopentenyl group.

The group described acids are only slightly soluble in water, but dissolve in solution of bases, such as sodium hydroxide, to form soluble salts.

The scope of the invention should be determined by reference to the appended claims, said claims being construed as broadly as possible consistent with the state of the art.

I claim as my invention:

1. New compounds of the formula

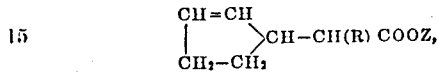

in which R represents an alkyl group containing five or more carbon atoms, and Z represents hydrogen or a substituted hydrogen, such as a metal or an alkyl group.

2. New compounds of the formula

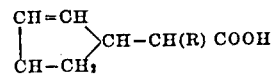

in which R represents an alkyl group containing five or more carbon atoms.

3. As a new medicament, a $\Delta^2$-cyclopentenyl nonyl acetic substance, having the formula

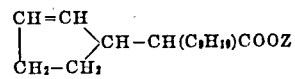

in which Z represents hydrogen, a metallic element or an alykl group.

ROGER ADAMS.